United States Patent
Ohkado et al.

(10) Patent No.: US 6,295,414 B1
(45) Date of Patent: *Sep. 25, 2001

(54) APPARATUS WITH INFORMATION ERASURE BASED ON LAST FILM FRAME

(75) Inventors: Teruyuki Ohkado; Yoshimasa Hyodo, both of Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,214

(22) Filed: Sep. 9, 1998

(30) Foreign Application Priority Data

Sep. 12, 1997 (JP) .................................................. 9-265124

(51) Int. Cl.[7] ........................... G03B 17/24; G03B 17/00; G03B 17/36; G03B 1/60
(52) U.S. Cl. ........................... 396/207; 396/284; 396/390
(58) Field of Search ........................... 396/281, 287–292, 396/390, 515, 310, 321, 207, 208, 211, 284, 319

(56) References Cited

U.S. PATENT DOCUMENTS

| 5,671,455 | * | 9/1997 | Nagata et al. | 396/390 |
|---|---|---|---|---|
| 5,895,135 | * | 4/1999 | Funaki | 396/319 |
| 5,953,547 | * | 9/1999 | Imai et al. | 396/515 |
| 5,969,322 | * | 10/1999 | Mori et al. | 396/284 |
| 5,970,264 | * | 10/1999 | Funaki | 396/390 |

FOREIGN PATENT DOCUMENTS 04-257837 * 9/1992 (JP) .

* cited by examiner

*Primary Examiner*—Alan A. Mathews
(74) *Attorney, Agent, or Firm*—Robin, Blecker & Daley

(57) ABSTRACT

An apparatus, such as a camera, includes a storage device which stores at least one of cartridge-identifying information for identifying each individual film cartridge and history information indicative of contents of a usage history of a film cartridge corresponding to the cartridge-identifying information, and a determination device which determines whether to leave the storage device storing at least one of the cartridge-identifying information of a film cartridge to be taken out from the apparatus and the history information corresponding to the cartridge-identifying information of the film cartridge.

14 Claims, 10 Drawing Sheets

APPARATUS WITH INFORMATION ERASURE BASED ON LAST FILM FRAME

BACKGROUND OF THE INVENTION

1. Field of the Invention

The present invention relates to an improvement on an apparatus, such as a camera, using information provided for identification of each individual film cartridge.

2. Description of Related Art

A technique for providing a magnetic recording part on a film and recording and reproducing information about the film and matters related to photo-taking into and from the magnetic recording part has already come to be popularly practiced.

In a camera using such a type of film, by detecting a film cartridge indicator (which is provided on the film cartridge for indicating which film among an unused film, a partially-exposed film, an exposed film and a developed film is contained in the film cartridge loaded into the camera; hereinafter, the film cartridge indicator being referred to as the VEI indicator) and magnetic information recorded on the magnetic recording part of the film, even after a partially-exposed film is temporarily rewound into the film cartridge, the film cartridge containing the partially-exposed film can be loaded again into the camera to set the first one of unexposed frames of the film to an aperture position of the camera, so that a photo-taking operation can resume on the film cartridge. However, in a case where a film cartridge containing a partially-exposed film is taken out from the camera, although the photographer can recognize the partially-exposed state of the film by viewing the VEI indicator, it is not easy for the photographer to verify up to which of frames the film has been exposed.

To solve this problem, there has been recently proposed a camera capable of storing and displaying an ID number of each film carridge and the number of exposed frames of film corresponding to the ID number. This camera is arranged to store the number of exposed frames when the film is temporarily rewound in a partially-exposed state, and then, to store the ID number of the film cartridge in response to an ID number input action caused by an ID number input operation by the photographer, so that the film cartridge ID number is correlated with the number of exposed frames. In other words, if the photographer designates an ID number of a film cartridge when the camera is in a predetermined mode after the ID number input action, the number of exposed frames of film of the cartridge is displayed on a display device of the camera, so that the photographer can recognize the number of exposed frames of film of the particular film cartridge.

In a case where, as described above, the camera has such a structure as to store an ID number of a film cartridge and the number of exposed frames of film of the film cartridge corresponding to the ID number into a storage element, since there is a limit to the storage capacity of the storage element, a problem arises in that only information for a limited number of film cartridges (for example, five cartridges) can be stored.

BRIEF SUMMARY OF THE INVENTION

In accordance with one aspect of the invention, there is provided an apparatus, such as a camera, comprising a storage device which stores at least one of cartridge-identifying information for identifying each individual film cartridge and history information indicative of contents of a usage history of a film cartridge corresponding to the cartridge-identifying information, and a determination device which determines whether to leave the storage device storing at least one of the cartridge-identifying information of a film cartridge to be taken out from the apparatus and the history information corresponding to the cartridge-identifying information of the film cartridge, so that the limited storage capacity of the storage device can be efficiently used with good operability.

The other aspects of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
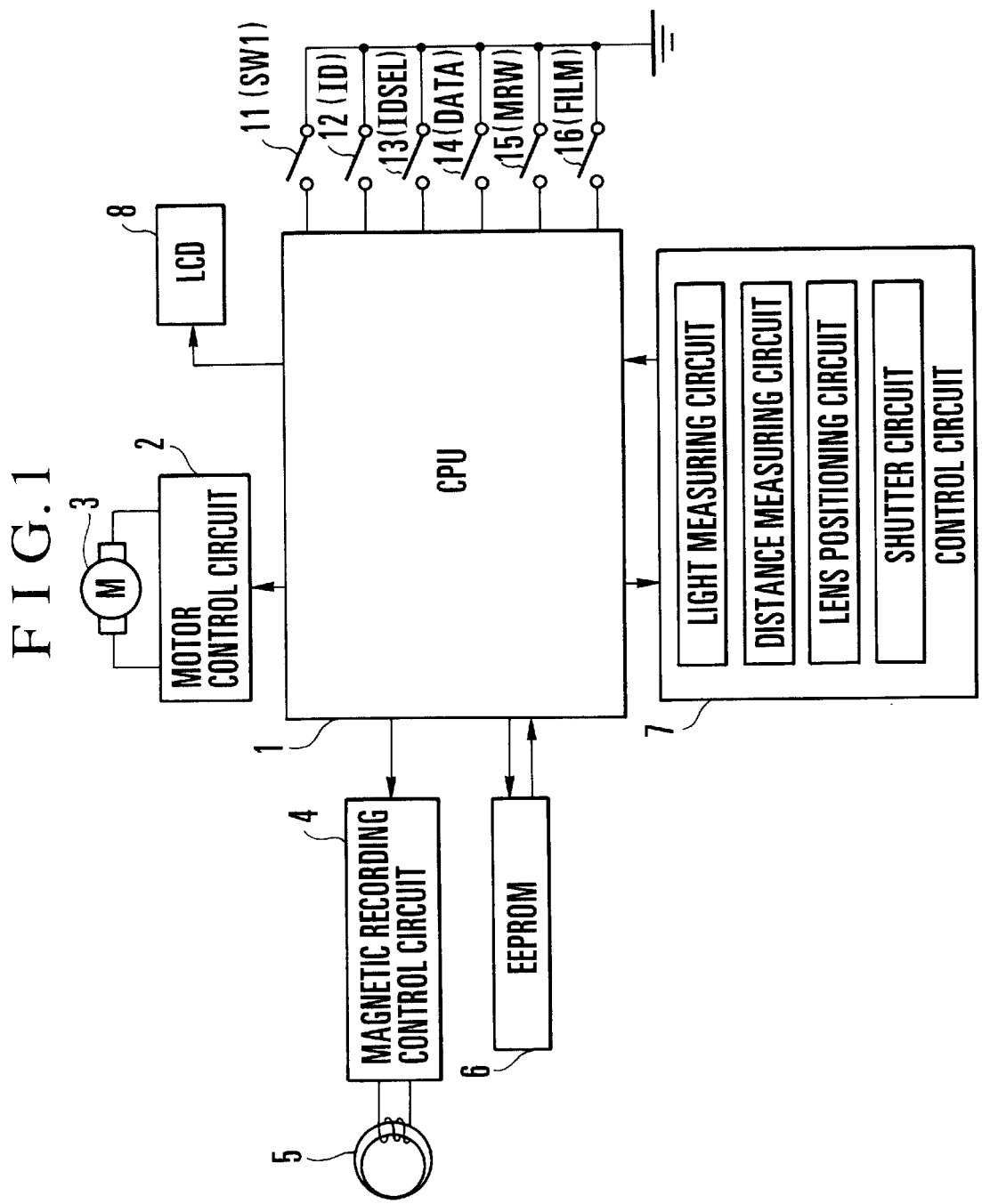
FIG. 1 is a block diagram showing the whole electric circuit arrangement of a camera according to a first embodiment of the invention.

FIG. 1 shows in a block diagram the arrangement of an electrical system of a camera according to a first embodiment of the invention. Referring to FIG. 1, a CPU 1 is arranged to control the whole system of the camera. A motor control circuit 2 is arranged to drive and control a motor 3 which is provided for winding and rewinding a film. A magnetic recording control circuit 4 is arranged to drive and control a magnetic head 5 for recording magnetic information on a film. An EEPROM 6 is a nonvolatile storage element provided for storing therein an ID number of a film cartridge, the number of exposed frames, photo-taking information, etc. A circuit block 7 is composed of a light measuring circuit, a distance measuring circuit, a lens positioning circuit, a shutter circuit and a control circuit, which are arranged to carry out the photo-taking actions of the camera. An LCD (liquid crystal display device) 8 is arranged to display thereon a frame number of a frame currently located in a photo-taking position, a film cartridge ID number, the number of exposed frames, photo-taking information, etc.

Reference numerals 11 to 16 denote switches. The switch 11 (also denoted as SW1) is arranged to generate a photo-taking action start signal. The switch 12 (also denoted as ID) is provided for displaying an ID number and also for deciding an ID number. The switch 13 (also denoted as IDSEL) is provided for selecting an ID number. The switch 14 (also denoted as DATA) is provided for causing film information corresponding to an ID number to be displayed. The switch 15 (also denoted as MRW) is provided for rewinding a film midway in a partially-exposed state. The switch 16 (also denoted as FILM) is provided for detecting whether or not the camera is loaded with a film cartridge.

An operation of the camera having the above structure is described below by using a flow chart of the CPU 1 shown in FIG. 2.

Figure 2:
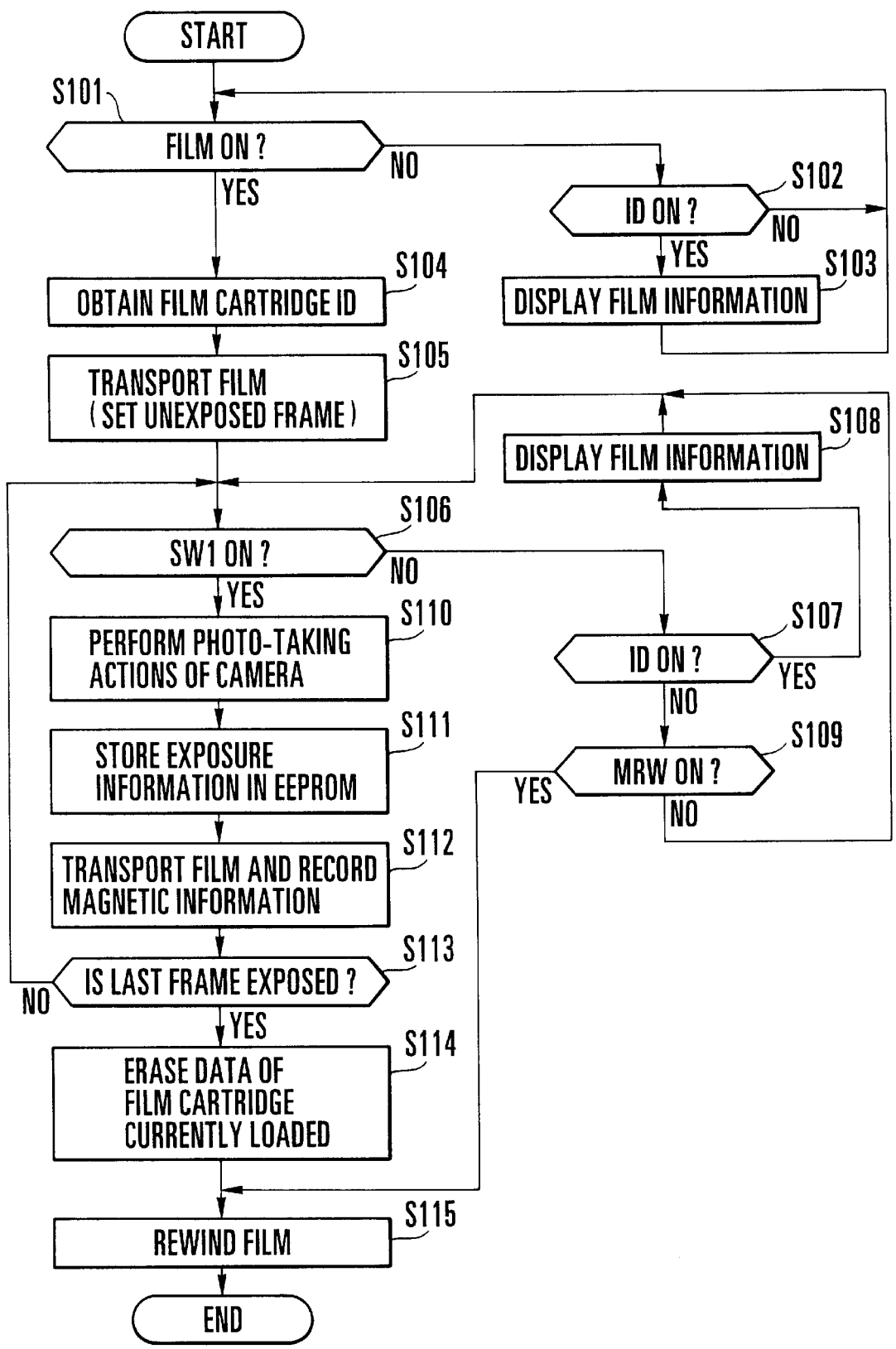
FIG. 2 is a flow chart showing an operation of the camera according to the first embodiment.

At a step S101 of FIG. 2, a check is made for an on-state of the switch FILM to find if the camera is loaded with a film cartridge (not shown). If not, the flow of operation proceeds to a step S102 to find if the switch ID is in its on-state. If not, the flow returns to the step S101. If so, the flow proceeds to a step S103. At the step S103, the LCD 8 is caused to display predetermined data, which will be referred to as "film information" and will be described in detail later herein. After the step S103, the flow returns to the step S101.

In other words, if the camera is not loaded with any film cartridge, a loop of steps S101–S102–S101 or a loop of steps S101–S102–S103–S101 is repeated.

If the camera is judged at the step S101 to be loaded with a film cartridge, the flow proceeds to a step S104. At the step S104, the ID number of the film cartridge loaded is obtained in a manner as will be described in detail later herein. At the next step S105, the film is transported and a film indexing process is performed to set the first one of photographable frames (unexposed frames) to an aperture position by causing the motor control circuit 2 to drive the motor 3. In this instance, either a latch for a case where the currently loaded film cartridge contains an unused film or a latch for a case where the currently loaded film cartridge contains a partially-exposed film must have been set in the step S104. In the case of an unused-film cartridge, the first frame portion of the film is set to the aperture position. In the event of a partially-exposed-film cartridge, since the ID number of the film cartridge and the number of exposed frames must have been stored in the EEPROM 6, the film is transported to have a photographable frame (unexposed frame) set to the aperture position on the basis of such stored information. In both cases of the unused-film cartridge and the partially-exposed-film cartridge, the film is set by detecting perforations provided in the film.

In the first embodiment, unlike conventional cameras, even a partially-exposed film does not necessitate a process of reproducing magnetic information recorded at exposed frames to index an unexposed frame, because the number of exposed frames of the film is known.

At the next step S106, a check is made for an on-state of the switch SW1 which is provided for generating a photo-taking start signal. If the switch SW1 is found to be not in its on-state, the flow proceeds to a step S107. At the step S107, a check is made to find if the switch ID is in its on-state. If so, the flow proceeds to a step S108 to display predetermined data on the LCD 8 in the same manner as at the above-stated step S103. In other words, film information is displayed as will be further described later herein. The flow then returns from the step S108 to the step S106. If the switch ID is found at the step S107 to be not in its on-state, the flow proceeds to a step S109. At the step S109, a check is made to find if the switch MRW is in an on-state. If so, the flow proceeds to a step S115 to rewind the film. If not, the flow returns from the step S109 to the step S106.

In other words, if the switch SW1 is found at the step S106 to be not in its on-state and the switch MRW is also found at the step S109 to be not in its on-state, a loop of steps S106 to S109 is repeated.

If the switch SW1 is found at the above-stated step S106 to be in its on-state, the flow of operation proceeds to a step S110. At the step S110, the circuit block 7 is activated to carry out photo-taking actions of the camera including light measuring, distance measuring, lens positioning, shutter operating and lens position resetting actions. At the next step S111, the number of exposed frames stored in the EEPROM 6 is incremented by one (+1) to update data of the number of exposed frames. At a step S112, the motor control circuit 2 is caused to drive the motor 3 to transport the film to an extent corresponding to one frame. At the same time, the magnetic head 5 is caused through the magnetic recording control circuit 4 to magnetically record photo-taking information, the ID number of the film cartridge, etc., on a magnetic recording part of the film during transportation of the film. Incidentally, in viewing images on a monitor, the record thus provided in the magnetic recording part of the film is helpful, for example, in arranging and rearranging the images.

After the step S112, the flow proceeds to a step S113. At the step S113, a check is made by a known last-frame-of-film deciding method to find if the last frame of the film has been exposed. If not, the flow returns to the step S106 to wait for the commencement of an exposure action on the next frame. If so, the flow proceeds to a step S114. At the step S114, the data stored in the EEPROM 6 relative to the ID number and the number of exposed frames of the film cartridge currently loaded on the camera is erased. A storage area which is left vacant by the erasure is kept there as a data storing area to be newly used for an unused-film cartridge. At the next step S115, the motor control circuit 2 is caused to drive the motor 3 to rewind the film, thereby terminating one series of actions.

The manner of changes of data stored in the EEPROM 6 is described below with reference to FIGS. 5A, 5B and 5C.

Figure 5A:
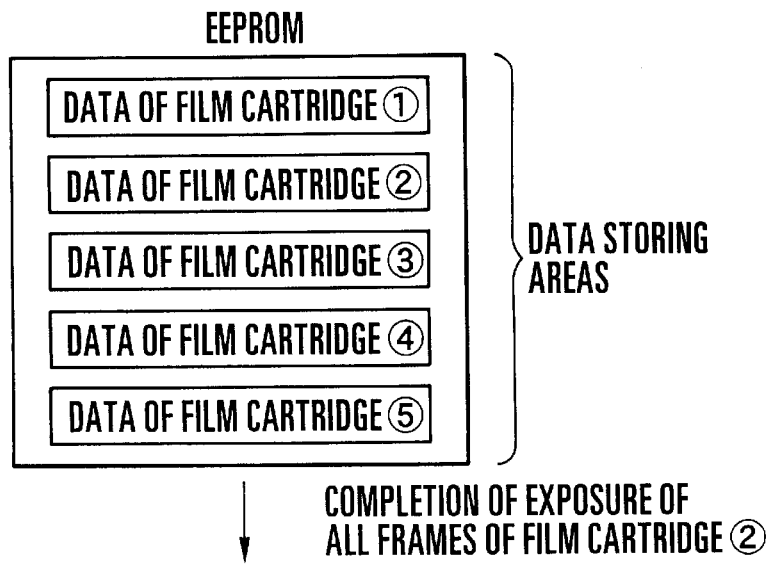
FIGS. 5A, 5B and 5C show the manner of changes of data stored within an EEPROM shown in FIG. 1.
Figure 5B:
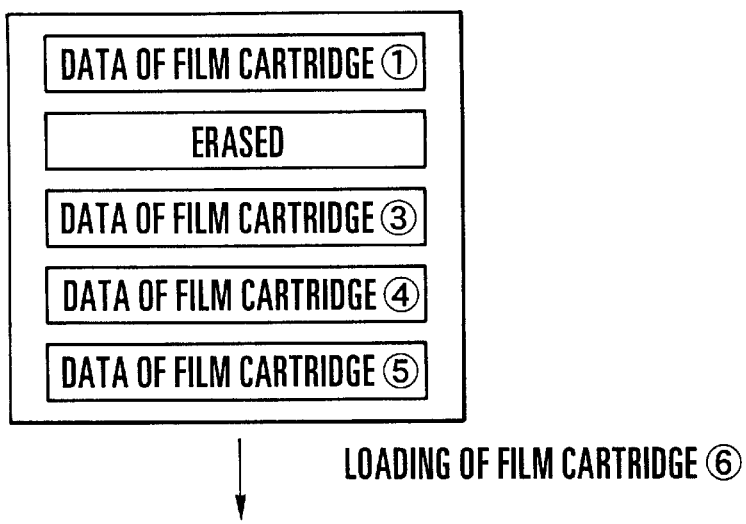
Figure 5C:
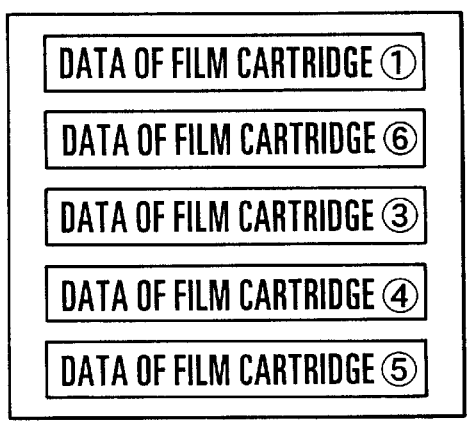

FIGS. 5A, 5B and 5C show the data storing areas arranged within the EEPROM 6 in various states. In the state shown in FIG. 5A, while each of four film cartridges ①, ③, ④ and ⑤ has been taken out from the camera in a partially-exposed state, a film cartridge ② is currently loaded in the camera, and in respect of the flow chart of FIG. 2, the camera is then in a state corresponding to the steps S104 to S113. In this state, data of the ID numbers and the numbers of exposed frames of the film cartridges ① to ⑤ is stored in the EEPROM 6.

FIG. 5B shows the state of the inside of the EEPROM 6 when the last frame of film of the film cartridge ② currently loaded in the camera has been exposed and data of the film cartridge ② has been erased. This state corresponds to the step S115 of the flow chart of FIG. 2.

FIG. 5C shows the state of the inside of the EEPROM 6 when the camera is loaded with an unused-film cartridge ⑥ after the state shown in FIG. 5B. This state corresponds to the steps S104 to S113 of the flow chart of FIG. 2. In that state, data of the ID numbers and the numbers of exposed frames of the film cartridges ①, ③, ④, ⑤ and ⑥ is stored in the EEPROM 6.

In other words, FIGS. 5A, 5B and 5C show that the data relative to the film cartridge ② is erased and the erased storage area is secured for the unused-film cartridge ⑥ which is newly loaded in the camera.

Generally, data of the ID number of a film cartridge and the number of exposed frames of film corresponding to the ID number becomes unnecessary after completion of a photo-taking (exposure) operation on all the frames of film of the film cartridge. Since one of four film using states including an unused state, a partially-exposed state, an exposed state and a developed state is indicated by the VEI indicator provided on the film cartridge, the film cartridge which has been completely used for photo-taking can be readily recognized from the indication of the "exposed" state. The arrangement for erasing unnecessary information of the exposed-film cartridge and storing, in place, information of a new film cartridge, as described above, therefore, permits effective use of the limited storage capacity of the EEPROM 6.

Figure 3:
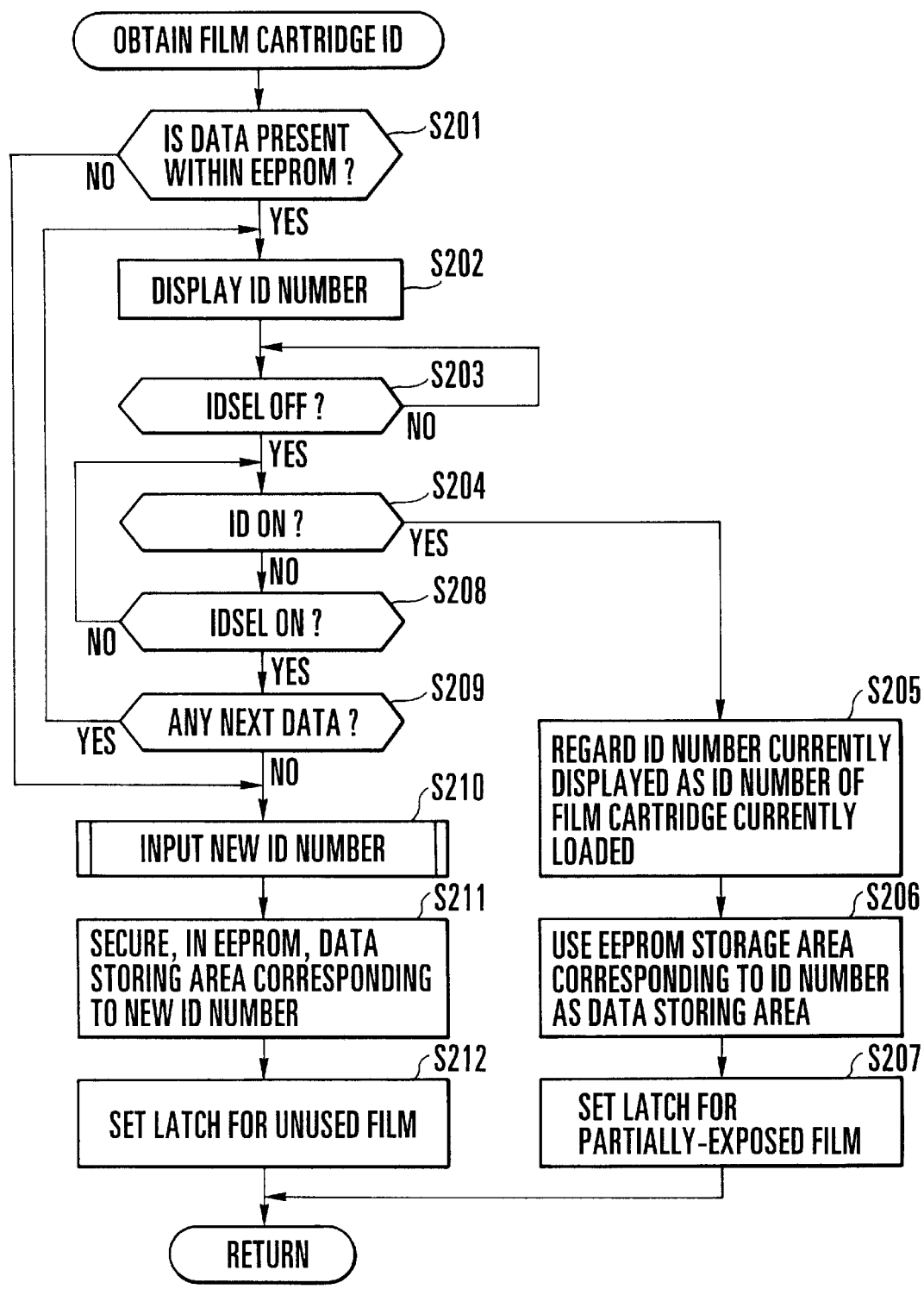
FIG. 3 is a flow chart showing the details of a step S104 of the flow chart of FIG. 2.

Referring next to FIG. 3 which is a flow chart showing the details of the step S104 of FIG. 2, a flow of operation for obtaining the film cartridge ID number is described as follows.

At a step S201, a check is made to find if any data of the ID numbers and the numbers of exposed frames of previously loaded film cartridges is stored within the EEPROM 6. If there is absolutely no data in storage, the flow of operation proceeds to a step S210. If there is the data within the EEPROM 6, the flow proceeds to a step S202.

At the step S202, one of the ID numbers (the smallest of numbers, for example) of the film cartridges stored within the EEPROM 6 is displayed on the LCD 8. At the next step S203, a check is made for the state of the switch IDSEL to find if it is in its off-state to allow the flow of operation to proceed to the next step. If not, the step S203 is repeated until the switch IDSEL turns on. When the switch IDSEL is found to be in its off-state, the flow proceeds to a step S204. At the step S204, a check is made to find if the switch ID is in its on-state, which allows an ID number currently on display to be used as the ID number of the film cartridge currently loaded in the camera. If not, the flow proceeds to a step S208. At the step S208, a check is made for the state of the switch IDSEL to find whether an ID number other than the ID number currently on display is desired to be displayed or input of a new ID number is desired. If the switch IDSEL is found not in its on-state, the flow returns to the step S204. In other words, if both the switches ID and IDSEL are found at the steps S204 and S208 to be not in their on-states, no decision is assumed to have been made as yet, so that the flow repeats the steps S204 and S208.

When the switch IDSEL is found at the step S208 in its on-state, the flow of operation proceeds to a step S209. At the step S209, a check is made to find if there is data of any ID number that has not been displayed as yet within the EEPROM 6. If so, the flow returns to the step S202 to display the ID number, which is, for example, smallest next to the ID number displayed last time. The data of ID numbers in store within the EEPROM 6 are thus displayed at the step S202 by rotation in the order of, for example, smaller ones every time the switch IDSEL is found at the step S208 to be in its on-state. With one round of the display rotation coming to an end, when no ID number is left undisplayed any longer, the flow proceeds from the step S209 to the step S210.

At the step S210, the camera is in a mode of inputting an ID number of a new unused-film cartridge. A new ID number is inputted by a suitable switch input operation. At the next step S211, a data storing area is secured within the EEPROM 6 for data of the new ID number. At a step S212, a latch for unused-film is set as reference to be used in determining an unexposed frame of film at subsequent steps. The flow of operation then comes to an end.

At the above-stated step S204, if the switch ID is found in its on-state, the flow proceeds from the step S204 to a step S205. At the step S205, it is verified that the camera is loaded with a film cartridge of an ID number which is the same as the ID number currently on display. At the next step S206, an area corresponding to the ID number currently on display is decided to be a data storing area. Thus, after that, updating of data is performed on the data storing area, or when all frames of the film have been exposed, data of the storing area is erased in the same manner as the step S114 of FIG. 2 described in the foregoing. At a step S207, a latch for partially-exposed film is set to be used for reference in determining an unexposed frame of film at subsequent steps. The flow of operation then comes to an end.

A routine for displaying film information to be executed at the step S103 or S108 of FIG. 2 is described below with reference to FIG. 4 which is a flow chart.

The flow of operation enters this routine when the switch ID is turned on by the user for having film information displayed on the LCD 8.

Figure 4:
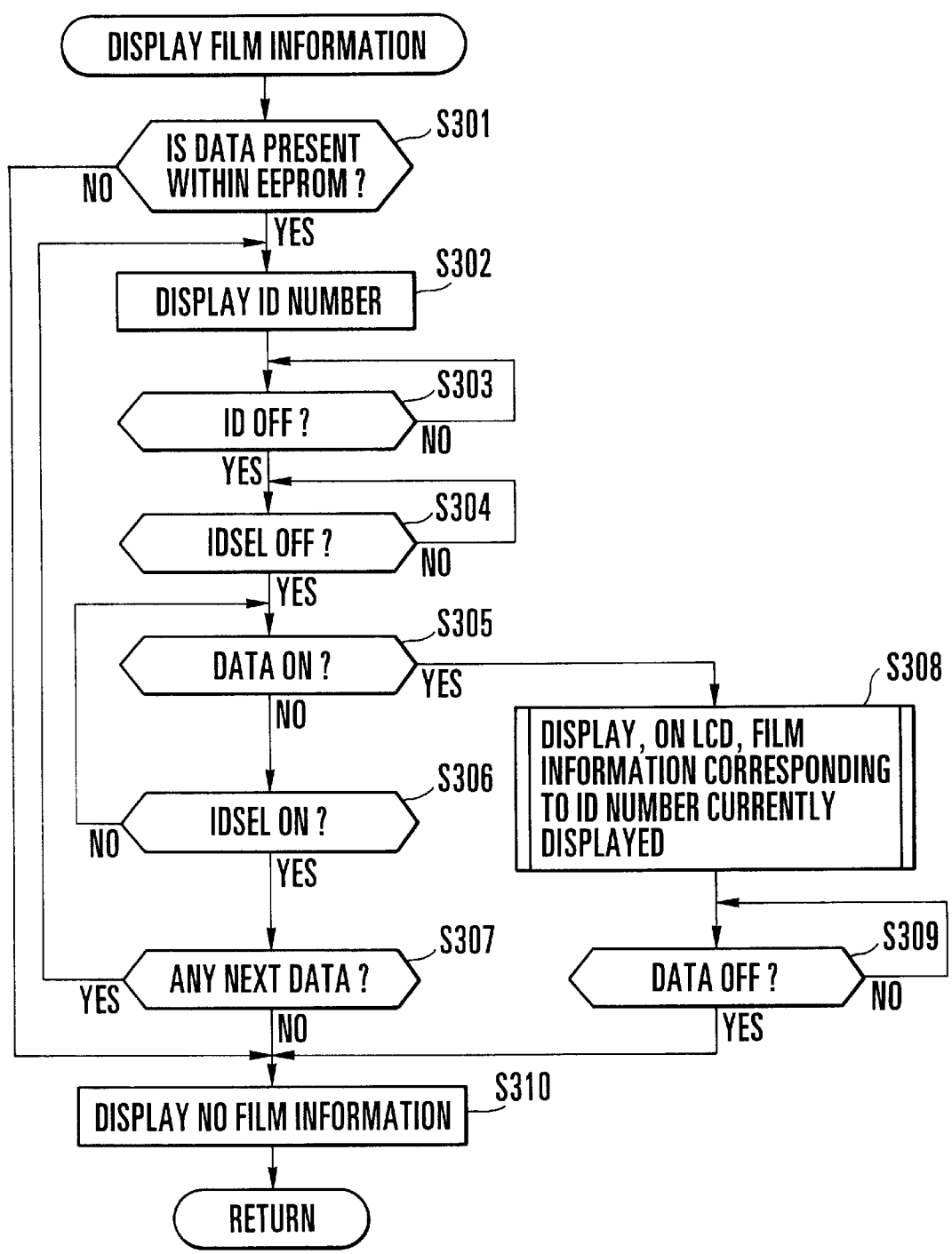
FIG. 4 is a flow chart showing the details of a step S103 or S108 of the flow chart of FIG. 2.

At a step S301 of FIG. 4, a check is made to find if data of the ID numbers and the numbers of exposed frames of film cartridges previously loaded in the camera is left in store within the EEPROM 6. If there is absolutely no data, the flow proceeds to a step S310 to bring this routine to an end by rendering the LCD 8 undisplayable. If there is the data, the flow proceeds from the S301 to a step S302. At the step S302, one of the film cartridge ID numbers which is, for example, the smallest of the numbers is displayed on the LCD 8. At a step S303, the flow waits until the switch ID turns off.

When the switch ID turns off, the flow proceeds from the step S303 to a step S304. At the step S304, a check is made to find if the switch IDSEL is in its off-state, which allows the flow to proceed to the next step. If not, the step S304 is repeated. When the switch IDSEL is found in its off-state, the flow proceeds from the step S304 to a step S305. At the step S305, a check is made to find if the switch DATA is in its on-state, which allows data corresponding to the ID number currently on display to be displayed. If not, the flow proceeds to a step S306. At the step S306, a check is made to find if the switch IDSEL is in its on-state, which indicates that data other than the data of the ID number currently on display is desired to be displayed. If not, the flow returns to the step S305. In other words, if both the switches DATA and IDSEL are found in their on-states at the steps S305 and S306, the steps S305 and S306 are repeated on the assumption that no decision has not been made as yet.

When the switch IDSEL is found at the step S306 in its on-state, the flow proceeds to a step S307. At the step S307, a check is made to find if data of any ID number is still left undisplayed within the EEPROM 6. If so, the flow returns to the step S302 to display another ID number, which is, for example, smallest next to the ID number last displayed.

Therefore, at the step S302, the data of ID numbers stored in the EEPROM 6 are displayed on the LCD 8 in rotation every time the switch IDSEL is found in its on-state at the step S306. When all the ID numbers are displayed by one round of rotation leaving no undisplayed ID number, the user is assumed at the step S307 to have no intention of having any further display, and the flow proceeds from the step S307 to a step S310. At the step S310, the LCD 8 is rendered undisplayable, and the film information display routine comes to an end.

Further, if the switch DATA is found at the step S305 to be in its on-state, data corresponding to the ID number currently on display is assumed to be displayable, and the flow proceeds to a step S308. At the step S308, the data corresponding to the ID number currently on display is displayed on the LCD 8. At the next step S309, a check is made to find if the switch DATA is in its off-state. If not, the step S309 is repeated. When the switch DATA is found in its off-state, the flow proceeds from the step S309 to the step S310. At the step 310, as mentioned above, the LCD 8 is rendered undisplayable, and the film information display routine comes to an end. In other words, the routine is arranged to display the data corresponding to the ID number currently displayed on the LCD 8 just for a period during which the switch DATA remains in its on-state.

As described above, when a film cartridge is mounted, the first embodiment is arranged to first obtain the ID number of the film cartridge as shown at the step S104 of FIG. 2 and more particularly as shown at the steps S204, S205 and S206 or the steps S210, S211 and S212 of FIG. 3. Then, either the data stored in the EEPROM 6 relative to the film cartridge is updated or data is added thereto accordingly as frames are used for photo-taking one after another, as shown at the step Sill in FIG. 2. Further, when an exposure action on the last frame of the film finishes, the data stored in the EEPROM 6 for the film cartridge is erased, as shown at the step S114 in FIG. 2. Therefore, the storing action on the data of the film cartridge can be automatically carried out by effectively using the limited storage capacity of the EEPROM 6 with good operability.

Further, with the ID number of a film cartridge first obtained when the film cartridge is mounted as shown at the step S104 of FIG. 2 and with the film cartridge found to be a film cartridge which has temporarily been rewound in a partially-exposed state, information as to up to which of frames the film has been exposed is obtained from data stored in the EEPROM 6 relative to the film cartridge. Then, the film is transported to have an unexposed frame which is to be used for the next exposure set in a photo-taking position, as shown at the step S105 in FIG. 2. The provision of these steps obviates the necessity of magnetic reproduction means which has heretofore been indispensable. In accordance with the arrangement of the first embodiment, therefore, there is provided a camera which is inexpensive and has a simple structure.

Figure 6:
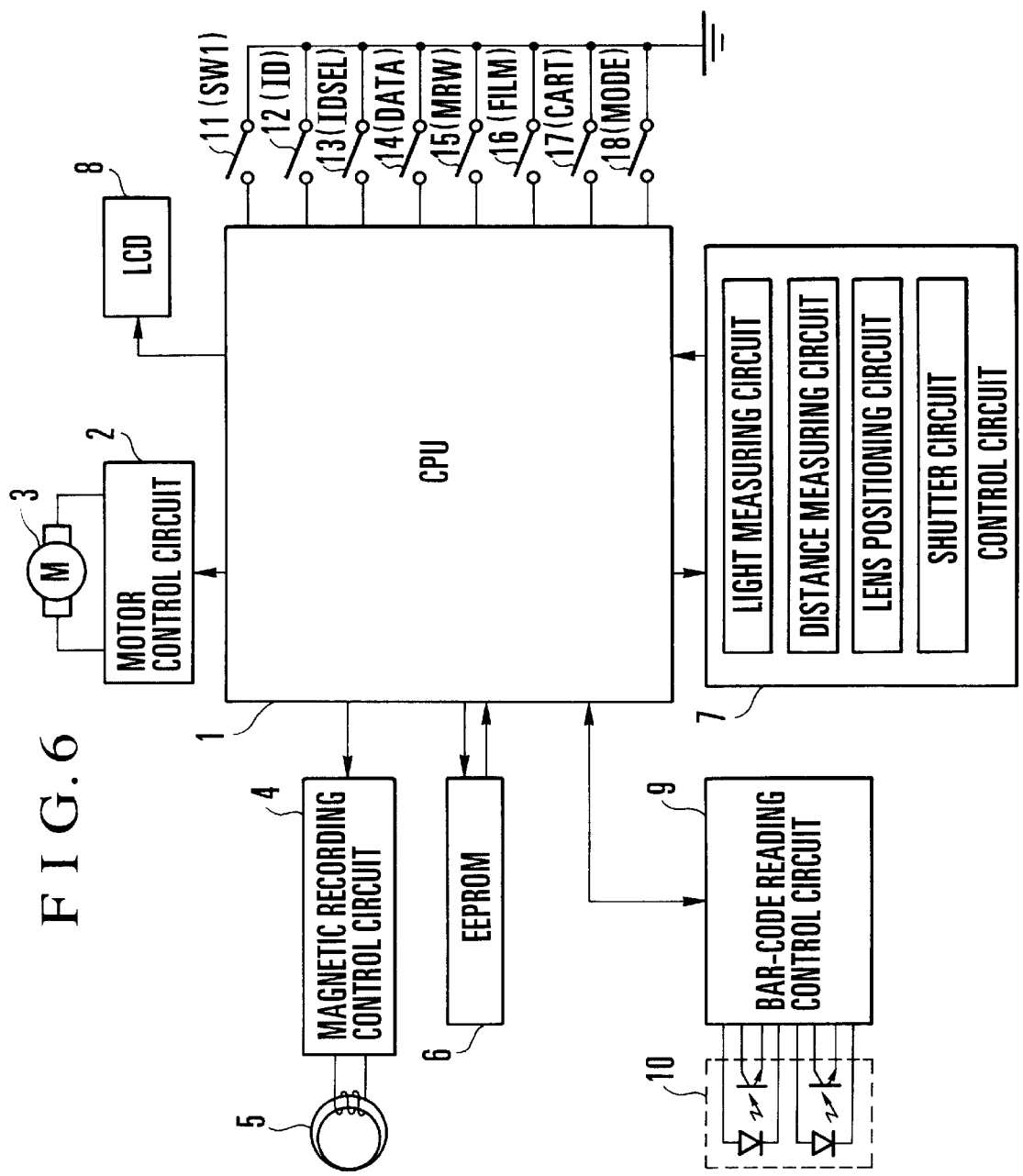
FIG. 6 is a block diagram showing the whole electric circuit arrangement of a camera according to a second embodiment of the invention.

FIG. 6 is a block diagram showing the arrangement of an electrical system of a camera according to a second embodiment of the invention. In FIG. 6, all parts identical with those of the first embodiment are indicated by the same reference numerals as in FIG. 1.

Referring to FIG. 6, a bar-code reading control circuit 9 drives and controls a photo-reflector 10 which is arranged to read a bar code provided on a film cartridge loaded in the camera. A switch 17 (also denoted as CART) is provided for detecting whether a film cartridge is loaded. The camera begins to read the bar code from the film cartridge when the switch 17 (CART) turns on. A switch 18 (also denoted as MODE) is provided for setting the operation mode of the camera. The camera is in a photographing mode when the switch 18 (MODE) is in its off-state, and in a non-photographing mode, i.e., a film data display mode, when the switch 18 (MODE) is in its on-state. In the second embodiment, a switch 16 (FILM) is provided for detecting the opened-state or closed-state of a cartridge chamber lid (the switch 16 (FIIM) turns on when the cartridge chamber lid is completely closed).

Figure 7A:
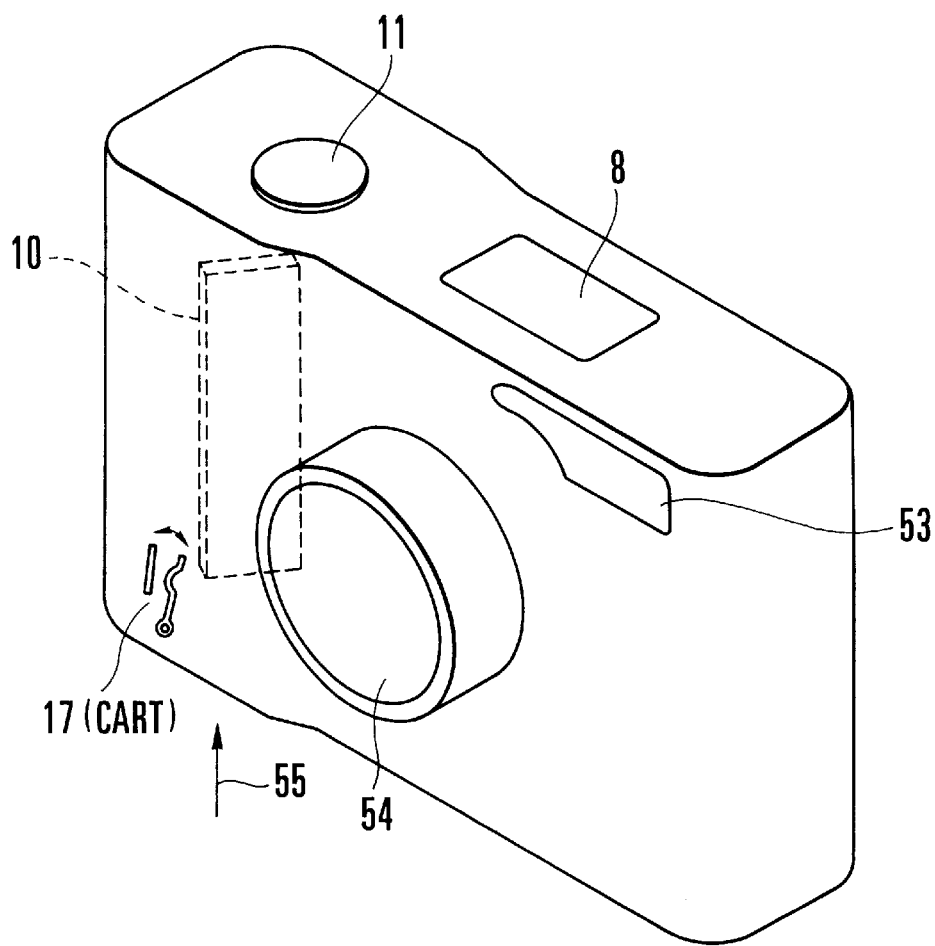
FIGS. 7A and 7B are perspective views respectively showing the camera according to the second embodiment and a film cartridge to be used by the camera.
Figure 7B:
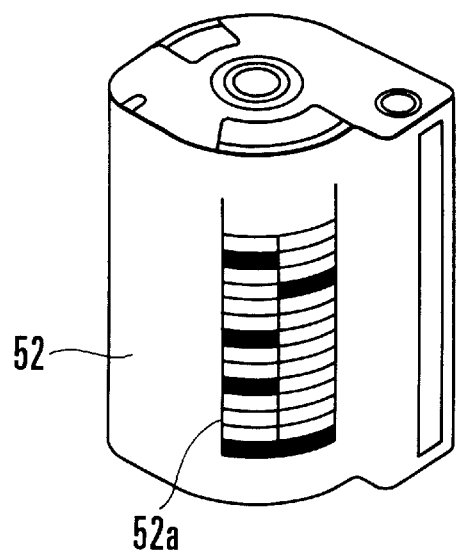

FIGS. 7A and 7B are perspective views respectively showing the camera according to the second embodiment and a film cartridge to be loaded in the camera. In FIGS. 7A and 7B, all parts that are identical with those of FIG. 6 are indicated by the same reference numerals.

Referring to FIGS. 7A an 7B, the film cartridge 52 contains a photographic film. A bar code 52a provided on the film cartridge 52 indicates the ID number of the individual film cartridge 52. A flash device 53 is arranged to emit light toward an object of shooting in taking a shot. Reference numeral 54 denotes a photo-taking lens barrel.

The bar code 52a which is provided on the film cartridge 52 is arranged as follows. After the switch CART turns on with the film cartridge 52 loaded in the camera (inserted into the camera body in the direction of an arrow 55 in FIG. 7A), when the film cartridge 52 is inserted further into the camera body, the bar code 52a is read at the same time by the photo-reflector 10 shown in FIG. 6.

The camera having the above structure operates as described below with reference to FIGS. 8 and 9, which are flow charts showing a flow of operation of the CPU 1.

Figure 8:
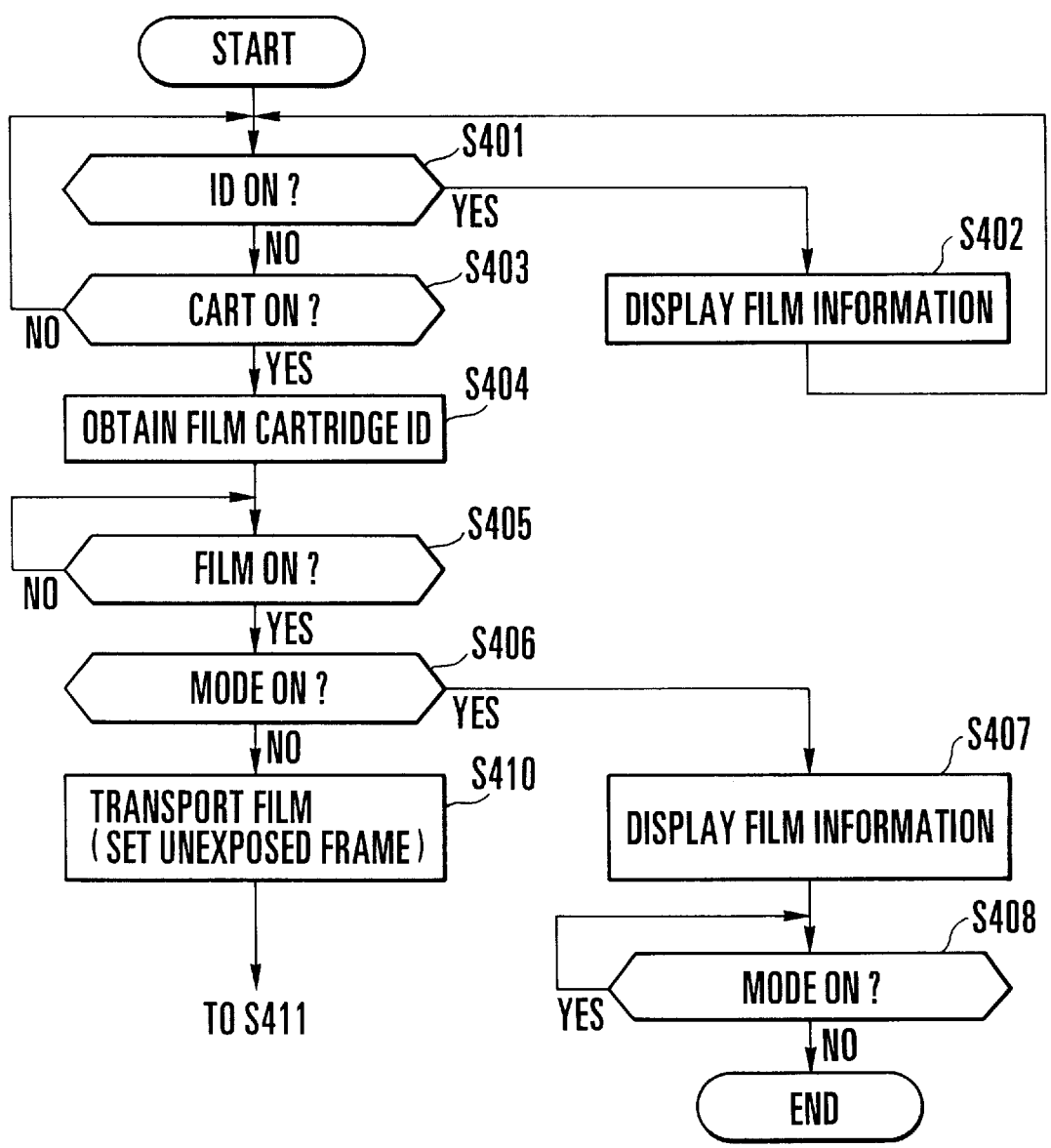
FIG. 8 is a flow chart showing an operation of the camera according to the second embodiment.

At a step S401 of FIG. 8, a check is made for the state of the switch ID which decides whether the film information is to be displayed. If the switch ID is found to be in an on-state, which is for displaying the film information, the flow proceeds to a step S402. At the step S402, predetermined data is displayed on the LCD 8 as shown in FIG. 4. The flow then returns to the step S401.

If the switch ID is found at the step S401 to be in its off-state, the flow proceeds to a step S403. At the step S403, a check is made to find if the switch CART is in its on-state, which indicates that the camera is being loaded with the film cartridge 52. If not, the flow returns to the step S401 as the camera is not loaded with the film cartridge 52. If so, the flow of operation proceeds to a step S404. At the step S404, the ID number of the film cartridge 52, which is being loaded in the camera, is read from the bar code 52a. This reading action will be described in detail later.

At the next step S405, a check is made to find if the switch FILM is in its on-state, which indicates that a film cartridge chamber lid is closed with the camera loaded with the film cartridge 52. If not, the step S405 is repeated. When the switch FILM is found to be in its on-state, the flow proceeds from the step S405 to a step S406. At the step S406, a check is made to find if the switch MODE is in its on-state, which indicates that the camera is set in a film data display mode and is not in a photo-taking mode. If so, the flow proceeds from the step S406 to a step S407.

At the step S407, the ID number of the film cartridge 52 which has been read at the step S404 and the number of exposed frames which is stored in the EEPROM 6 and which corresponds to the ID number are displayed on the LCD 8. The flow proceeds from the step S407 to a step S408. At the step S408, the flow waits until the switch MODE turns off. When the switch MODE is found to have turned off, a sequence of camera actions comes to an end.

Further, if the switch MODE is found at the step S406 to be in its off-state, the flow proceeds from the step S406 to a step S410. At the step S410, the motor control circuit 2 is caused to drive the motor 3 to set the first one of unexposed (photographable) frames in the photo-taking (aperture) position of the camera by transporting the film. In this instance, either a latch for a case where the currently loaded film cartridge contains an unused film or a latch for a case where the currently loaded film cartridge contains a partially-exposed film must have been set in the step S404. In the case of an unused-film cartridge, the first frame portion of the film is set to the aperture position. In the event of a partially-exposed-film cartridge, since the ID number of the film cartridge and the number of exposed frames must have been stored in the EEPROM 6, the film is transported to have a photographable frame (unexposed frame) set to the aperture position on the basis of such stored information. In both cases of the unused-film cartridge and the partially-exposed-film cartridge, the film is set by detecting perforations provided in the film.

In the second embodiment, unlike conventional cameras, even a partially-exposed film does not necessitate a process of reproducing magnetic information recorded at exposed frames to index an unexposed frame, because the number of exposed frames of the film is known.

Figure 9:
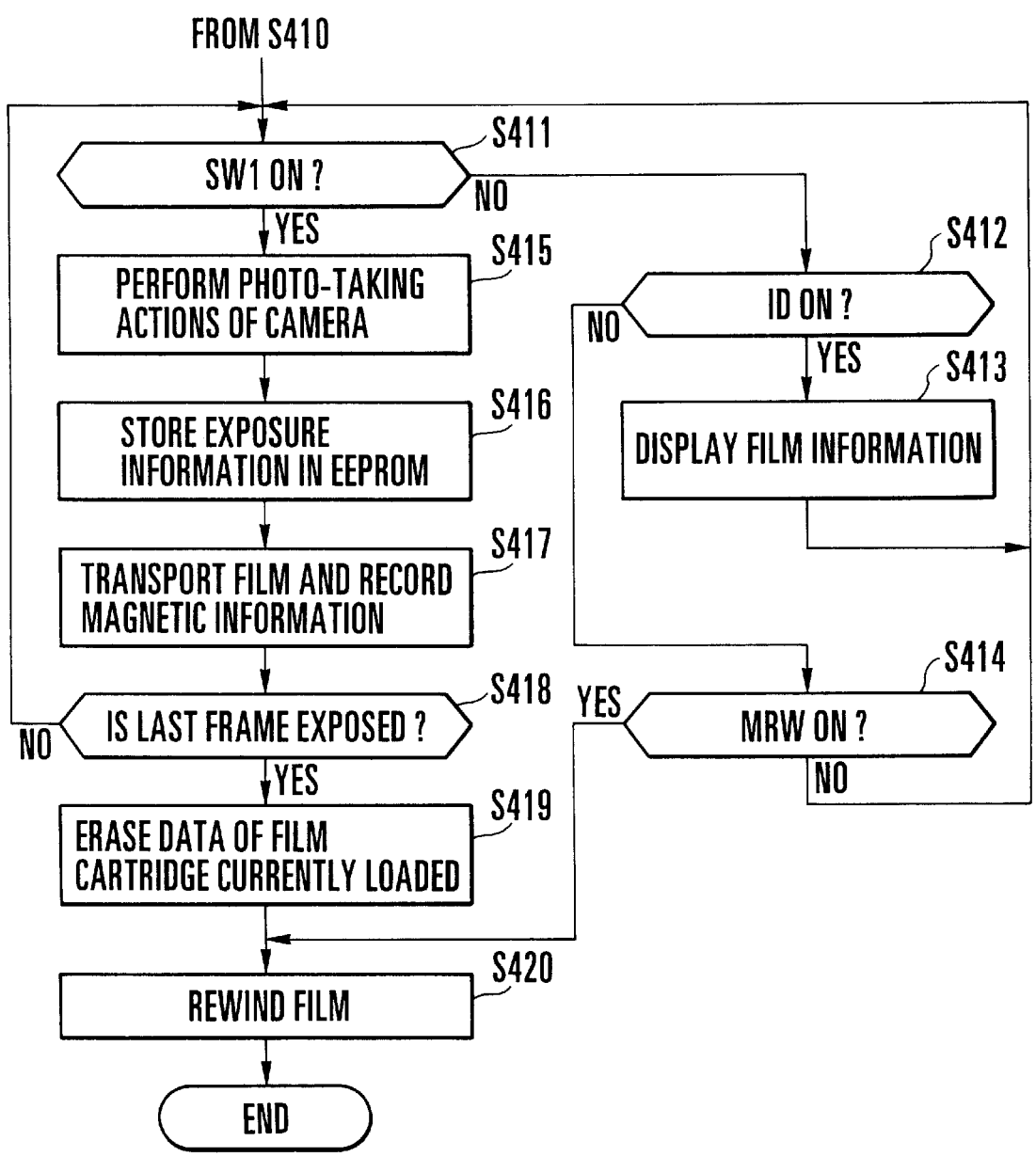
FIG. 9 is a flow chart showing an operation continued from the operation shown in FIG. 8.

After the step S410, the flow proceeds to a step S411 of FIG. 9. At the step S411, a check is made to find if the switch SW1 is in its on-state, which indicates generation of a photo-taking action start signal for the commencement of photo-taking actions of the camera. If not, the flow proceeds to a step S412. At the step S412, a check is made to find if the switch ID has been turned on. If so, the flow proceeds to a step S413 to have the predetermined data displayed on the LCD 8 in the same manner as the above-stated process of the step 402. After that, the flow returns to the step S411.

If the switch ID is found at the step S412 to be not in its on-state, the flow proceeds to a step S414. At the step S414, a check is made to find if the switch MRW is in its on-state. If so, the flow proceeds to a step S420 to cause the motor control circuit 2 to drive the motor 3 to rewind the film. If not, the flow returns from the step S414 to the step S411. In other words, the steps S411 to S414 are repeated if the switch SW1 is found at the step S411 to be not in its on-state.

When the switch SW1 is found at the step S411 to be in its on-state, the flow of operation proceeds to a step S415. At the step S415, the circuit block 7 is activated to perform a light measuring action, a distance measuring action, a lens positioning action, a shutter operating action, a lens position resetting action, etc. At a step S416, the number of exposed frames stored in the EEPROM 6 is incremented by one (+1) to update data of the number of exposed frames. At the next step S417, the motor control circuit 2 is caused to drive the motor 3 to transport the film to an extent corresponding to one frame. At the same time, the magnetic recording control circuit 4 is caused to drive the magnetic head 5 to magnetically record photo-taking information and the ID number of the film (cartridge) on the magnetic recording part of the film during transportation of the film.

At a step S418, a check is made by a known method to find if an exposure for the last frame of the film has finished. If not, the flow returns to the step S411 to wait until a decision is made as to whether or not an exposure is to be made for the next frame.

In a case where the exposure for the last frame of the film is judged to have finished at the step S418, the flow proceeds to a step S419. At the step S419, the data of the ID number and the number of exposed frames of the film cartridge currently loaded on the camera is erased to leave a data storing area for another film cartridge to be newly loaded in the camera. At the next step S420, the motor control circuit 2 is caused to drive the motor 3 to rewind the film, and a series of actions comes to an end.

The details of the step S404 of FIG. 8, which is for obtaining the ID number of the film cartridge, are next described with reference to FIG. 10 which is a flow chart.

Figure 10:
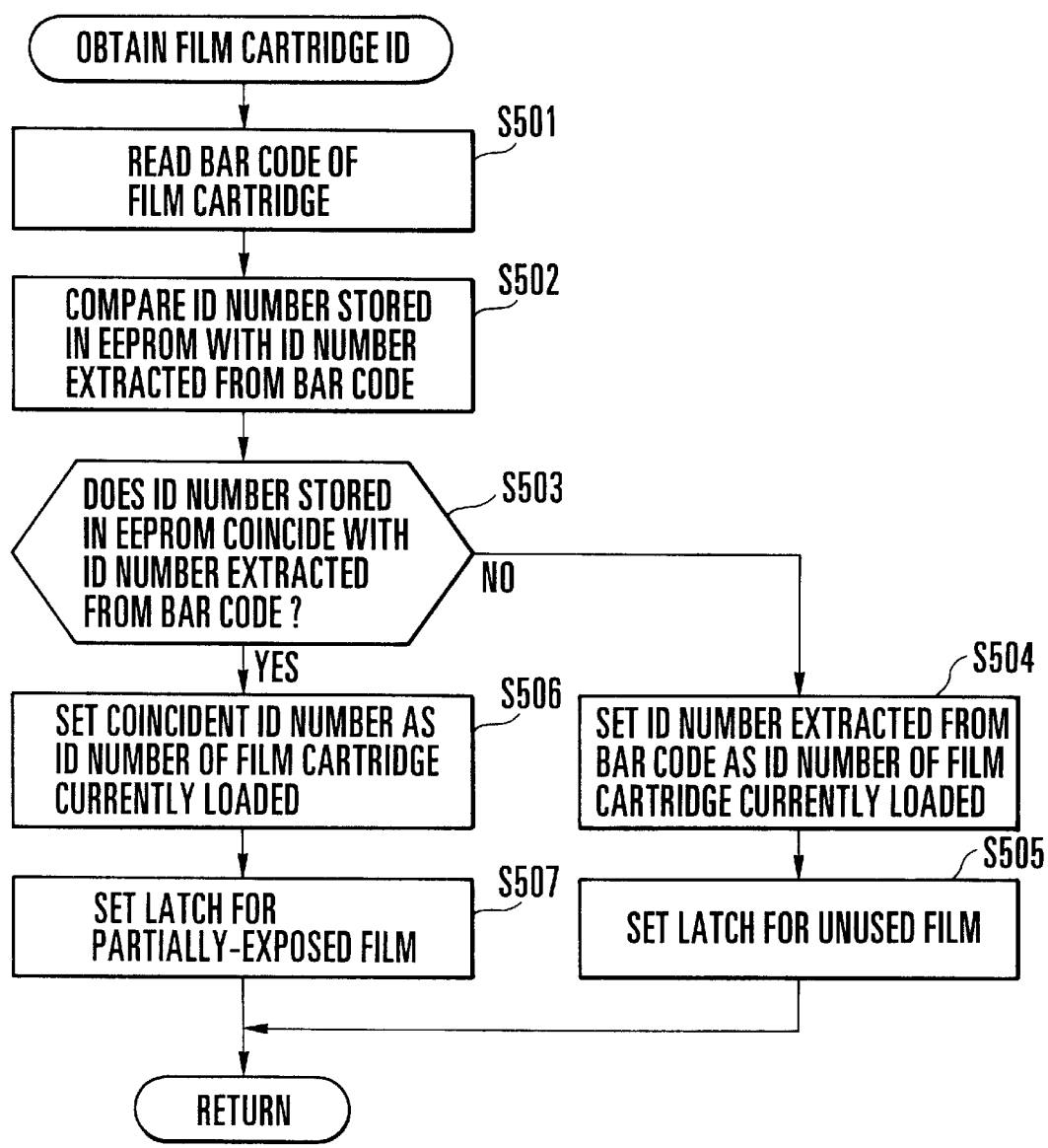
FIG. 10 is a flow chart showing the details of a step S404 of the flow chart of FIG. 8.

At a step S501 of FIG. 10, the photo-reflector 10 and the bar-code reading control circuit 9 are caused to read the bar code 52a from the film cartridge 52 when the film cartridge 52 is pushed further inside of the camera after the switch CART is caused to turn on by insertion of the film cartridge 52 as found at the step S403 of FIG. 8. With the film cartridge 52 assumed to be pushed at an even speed into a cartridge chamber of the camera, the photo-reflector 10 detects a brightness level and a darkness level in such a way as to read the bar code 52a from a relation between the brightness level and the darkness level.

At the next step S502, an ID number is extracted from the bar code 52a read from the film cartridge at the step S501. The ID number is compared with film cartridge ID numbers stored within the EEPROM 6. At the next step S503, a check is made to find if any of the ID numbers stored in the EEPROM 6 coincides with the ID number extracted from the bar code 52a.

In other words, the steps S502 and S503 are arranged to compare the ID number extracted from the bar code 52a with the ID numbers stored in the EEPROM 6, and to find whether the film cartridge loaded at present is an unused film cartridge or a film cartridge which has been used by this camera before and has been taken out from the camera in a partially-exposed state.

If none of the ID numbers stored in the EEPROM 6 is found at the step S503 to coincide with the ID number extracted from the bar code 52a, the currently loaded film cartridge is considered to be an unused film cartridge, and the flow proceeds to a step S504. At the step S504, a data storing area which corresponds to the ID number extracted from the bar code 52a is secured within the EEPROM 6. After that, the flow proceeds to a step S505. At the step S505, a latch for a unused film is set to be used as reference in determining an unexposed frame of film of the film cartridge at subsequent steps. The process of this routine then comes to an end.

In a case where one of the ID numbers stored in the EEPROM 6 is found at the step S503 to coincide with the ID number extracted from the bar code 52a, the film cartridge is considered to be a film cartridge which has been used by the camera before and is loaded again in the camera. The flow then proceeds to a step S506. At the step S506, the data storing area corresponding to the ID number extracted from the bar code 52a is secured to be used for updating or erasing the data hereafter for the film cartridge currently loaded in the camera, and the flow proceeds to a step S507. At the step S507, a latch for a partially-exposed film is set to be used as reference in determining an unexposed frame of film of the film cartridge at subsequent steps, and the process of this routine comes to an end.

In the second embodiment, when a film cartridge is loaded, the ID number of the film cartridge is first obtained, as shown at the step S404 of FIG. 8 and more specifically as shown in FIG. 10. Then, at the EEPROM 6, either the data of the film cartridge stored therein is updated or added accordingly as the photo-taking operation is performed on frames of the film, one after another, as shown at the step S416 of FIG. 9. With an exposure made for the last frame, the data of the film cartridge stored in the EEPROM 6 is erased, as shown at the step S419 of FIG. 9. Thus, data of film cartridges can be stored by efficiently using the limited storage capacity of the EEPROM 6.

Further, with a film cartridge loaded and with the ID number of the film cartridge first obtained (at the step S404 of FIG. 8), if the film cartridge loaded is found to be a film cartridge previously used by the camera and temporarily rewound in a partially-exposed state, information as to up to which of frames the film has been exposed is obtained from the data stored in the EEPROM 6 for that film cartridge. Then, the film is set to have an unexposed frame thereof in a photo-taking position, as shown at the step S410 of FIG. 8. The film which is in such a state, therefore, can be reliably set in position without having recourse to any magnetic reproducing means that has heretofore been considered indispensable. The arrangement of the second embodiment, therefore, permits the camera to be simply arranged at low cost.

Further, since in the second embodiment an ID number is automatically obtained from a film cartridge, the second embodiment excels the first embodiment in operability.

The individual components shown in schematic or block form in the drawings are all well known in the camera arts and their specific construction and operation are not critical to the operation or best mode for carrying out the invention.

While the invention has been described with respect to what is presently considered to be preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while each of the embodiments disclosed is arranged to store the number of exposed frames as film information corresponding to each of the ID numbers stored in the EEPROM, the film information to be stored according to the invention is not limited to the number of exposed frames. The film information which is on the history of use of each film cartridge and to be stored, for example, within the EEPROM may be arranged to indicate the photo-taking date of the last exposed frame or some messages or data either in place of or in addition to the number of unexposed frames.

While each embodiment disclosed is arranged to store the history information corresponding to the ID number or numbers in the EEPROM, the storage device to be used for this purpose in accordance with the invention is not limited to the EEPROM but may be any other storage means as long as it has a nonvolatile function.

Each embodiment disclosed is arranged to have the film cartridge ID number either manually inputted by the user or automatically inputted and optically read from the film cartridge by the camera. However, according to the invention, the ID number input arrangement may be changed to any manner as desired. For example, if the ID number is magnetically recorded on the film, the ID number may be read by a magnetic head which is arranged to act on the film. Further, the invention is applicable to any film cartridge that is provided with some ID means other than an ID number.

Each embodiment disclosed is arranged to store ID numbers as they are within the EEPROM and to correlate film history information with these ID numbers. However, in accordance with the invention, the ID numbers do not have to be stored as they are in the EEPROM, as long as the film information can be correlated to the ID numbers. In other words, the invention is applicable to any case where at least one of film-cartridge identifying information for identifying an individual film cartridge and film-history information corresponding to the film cartridge identifying information is arranged to be stored in the EEPROM.

Each embodiment disclosed is arranged to erase data of a film cartridge stored in the EEPROM including both the ID number and the history information corresponding to the ID number when the film of the film cartridge has been exposed up to the last frame. However, if necessary, this arrangement may be changed to erase only a part of the data.

While each embodiment disclosed is arranged to erase data stored in the EEPROM for a film cartridge when the film of the film cartridge has been completely exposed up to the last frame, the camera according to the invention may be also arranged as follows. In the case of a film cartridge which fails to satisfy some necessary conditions, such as a film cartridge the film of which is automatically rewound in a partially-exposed state as the film becomes no longer transportable due to some trouble, the data stored in the EEPROM for that film cartridge is erased like in the case of a completely-exposed film cartridge.

Further, while each embodiment disclosed is arranged to erase data stored in the EEPROM for a film cartridge when the film of the film cartridge has been completely exposed up to the last frame, the camera according to the invention may be also arranged as follows. In a case where a film cartridge happens to be rewound, for example, in response to an operation on a film-halfway-rewinding switch while it is in a state of used (exposed) only halfway, either some information on the film cartridge is stored in the EEPROM or rewritten or updated when it becomes necessary to store new information on the film cartridge, instead of immediately erasing the information.

While each of the embodiments disclosed is arranged to display both an ID number and film history information corresponding to the ID number, the arrangement may be changed to make only one of these displays.

While each of the embodiments disclosed is arranged to be capable of displaying, in response to a manual operation, ID information on the film cartridge read before the commencement of a film transport action, the display arrangement may be changed to be made not only in response to a manual operation but also automatically either always or at an arbitrary point of time, such as when the film is in process of being transported to bring the first one of unexposed frames to a photo-taking position or after the first unexposed frame is brought to the photo-taking position.

The invention is applicable to a case where an image recording medium other than a film is to be used.

Each embodiment disclosed can be arranged by interchanging the software arrangement and the hardware embodiment thereof with each other.

The invention applies to cases where either the whole or a part of claims or the arrangement of each embodiment described forms one apparatus or is used in combination with some other apparatus or as a component element of an apparatus.

The invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. A camera comprising:
   (A) a storage device which stores at least one of cartridge-identifying information for identifying each individual film cartridge and history information indicative of contents of a usage history of a film cartridge corresponding to the cartridge-identifying information; and (B) erasing means for erasing the information thus stored in said device if the last frame of the film of a film cartridge is already exposed.

2. A camera according to claim 1, wherein said storage device includes a nonvolatile memory.

3. A camera according to claim 1, wherein said storage device, when the information stored in the device is not erased by said erasing means, leaves the information stored therein at a point of time when the film cartridge is taken out from said camera.

4. A camera according to claim 1, further comprising a film transport device which performs, in accordance with information stored in said storage device, a film transport action for setting an unused frame of film of a film cartridge loaded in said camera.

5. A camera according to claim 1, wherein the history information includes at least one of number of exposed frames, a photo-taking date of a last exposed frame and a message relative to photo-taking.

6. A camera according to claim 1, further comprising a display device which displays information stored in said storage device, said display device displaying, according to a manual operation, information on each individual film cartridge stored in said storage device.

7. A camera according to claim 1, further comprising a reading device which reads the cartridge-identifying information from a film cartridge loaded in said camera.

8. A camera according to claim 7, further comprising a display device which displays at least one of the cartridge-identifying information read by said reading device and history information stored in said storage device and corresponding to the cartridge-identifying information.

9. A camera according to claim 8, wherein said display device is able to operate before a film of the film cartridge loaded in said camera is transported to have a leading one of photographable frames thereof set in a photo-taking position.

10. A camera comprising:

(A) a storage device which stores at least one of cartridge-identifying information for identifying each individual film cartridge and history information indicative of contents of a usage history of a film cartridge corresponding to the cartridge-identifying information; and (B) a control device which erases, if the last frame of the film of a film cartridge is already exposed, the information thus stored in said storage device and stores, if a film cartridge is newly loaded into said camera, in a storing area of the storage device in which the information is stored before it is erased, at least one of cartridge-identifying information for identifying the loaded film cartridge and history information indicative of contents of a usage history of the film cartridge corresponding to the cartridge-identifying information.

11. A camera comprising:

(A) a storage device which stores at least one of cartridge-identifying information for identifying each individual image storage device cartridge and history information indicative of contents of a usage history of an image storage device cartridge corresponding to the cartridge-identifying information; and (B) erasing means for erasing the information thus stored in said storage device if the last frame of the film of an image storage device cartridge is already exposed.

12. An apparatus comprising:

(A) a storage device which stores at least one of cartridge-identifying information for identifying each individual film cartridge and history information indicative of contents of a usage history of a film cartridge corresponding to the cartridge-identifying information; and (B) erasing means for erasing the information thus stored in said device if the last frame of the film of a film cartridge is already exposed.

13. An apparatus comprising:

(A) a storage device which stores at least one of cartridge-identifying information for identifying each individual film cartridge and history information indicative of contents of a usage history of a film cartridge corresponding to the cartridge-identifying information;

(B) a control device which erases, if the last frame of the film of a film cartridge is already exposed, the information thus stored in said storage device and stores, if a film cartridge is newly loaded into said camera, in a storing area of the storage device in which the information is stored before it is erased, at least one of cartridge-identifying information for identifying the loaded film cartridge and history information indicative of contents of a usage history of the film cartridge corresponding to the cartridge-identifying information.

14. An apparatus comprising:

(A) a storage device which stores at least one of cartridge-identifying information for identifying each individual image storage device cartridge and history information indicative of contents of a usage history of an image storage device cartridge corresponding to the cartridge-identifying information; and (B) erasing means for erasing the information thus stored in said storage device if the last frame of the film of an image storage device cartridge is already exposed.

* * * * *

UNITED STATES PATENT AND TRADEMARK OFFICE
CERTIFICATE OF CORRECTION

PATENT NO.    : 6,295,414 B1
DATED         : September 25, 2001
INVENTOR(S)   : Teruyuki Ohkado et al.

It is certified that error appears in the above-identified patent and that said Letters Patent is hereby corrected as shown below:

<u>Column 3,</u>
Line 51, delete "In-the" and insert -- In the --.

<u>Column 4,</u>
Line 14, delete "Sill" and insert -- S111 --.

<u>Column 7,</u>
Line 26, delete "Sill" and insert -- S111 --.

Signed and Sealed this

Fourth Day of June, 2002

*Attest:*

*Attesting Officer*

JAMES E. ROGAN
*Director of the United States Patent and Trademark Office*